(12) United States Patent
Newman

(10) Patent No.: US 9,214,092 B2
(45) Date of Patent: Dec. 15, 2015

(54) MINIMIZING CORIOLIS-TUMBLING INTENSITY IN A CENTRIFUGE-BASED-FLIGHT SIMULATOR

(71) Applicant: Environmental Tectonics Corporation, Southampton, PA (US)

(72) Inventor: Michael Charles Newman, Philadelphia, PA (US)

(73) Assignee: ENVIRONMENTAL TECTONICS CORPORATION, Southampton, PA (US)

( * ) Notice: Subject to any disclaimer, the term of this patent is extended or adjusted under 35 U.S.C. 154(b) by 107 days.

(21) Appl. No.: 13/834,707

(22) Filed: Mar. 15, 2013

(65) Prior Publication Data

US 2014/0212848 A1    Jul. 31, 2014

Related U.S. Application Data

(60) Provisional application No. 61/757,492, filed on Jan. 28, 2013.

(51) Int. Cl.
*G09B 9/12* (2006.01)
*G09B 9/10* (2006.01)

(52) U.S. Cl.
CPC ... *G09B 9/10* (2013.01); *G09B 9/12* (2013.01)

(58) Field of Classification Search
CPC .............. G09B 9/00; G09B 9/02; G09B 9/04; G09B 9/06; G09B 9/08; G09B 9/10; G09B 9/12; A63G 1/28; A63G 5/00; B64G 2007/005; B64G 1/60
USPC .................................................... 434/29–72
See application file for complete search history.

(56) References Cited

U.S. PATENT DOCUMENTS

| | | |
|---|---|---|
| 4,710,128 A | 12/1987 | Wachsmuth et al. |
| 4,751,662 A | 6/1988 | Crosbie |
| 5,021,982 A | 6/1991 | Crosbie et al. |
| 5,051,094 A | 9/1991 | Richter et al. |
| 5,353,242 A | 10/1994 | Crosbie et al. |
| 6,902,402 B2 | 6/2005 | McClintic |

(Continued)

OTHER PUBLICATIONS

International Preliminary Report on Patentability (Written Opinion of the International Searching Authority) of PCT Application No. PCT/US2012/0217128, Issued Dec. 26, 2012.

(Continued)

*Primary Examiner* — Timothy A Musselman
(74) *Attorney, Agent, or Firm* — Robert R. Axenfeld

(57) ABSTRACT

A system and method for minimizing or eliminating Coriolis-tumbling sensations on a trainee in a centrifuge-based simulator is described. In one example methodology, a simulator transitions its rate of rotation to replicate flight conditions in which G-forces are unloaded on a trainee from a first-G-force value to a nominal-G-force value. Before reaching the nominal-G-force value, an intermediate-G-force value—which is more than the nominal-G-force value, but less than the first-G-force value—is imparted and maintained on the trainee for a suitable duration of time. This intermediate-G-force value may be determined based on several factors including: (i) the angle of rotation of a gondola at during the first-G-force value, and/or (ii) the first-G-force value. After the intermediate-G-force value is imparted and maintained for a suitable duration of time, the G-forces imparted on the trainee may be further unloaded till the nominal-G force value is reached.

13 Claims, 12 Drawing Sheets

(56) References Cited

U.S. PATENT DOCUMENTS

2002/0164560 A1  11/2002  Borta
2004/0197742 A1  10/2004  Alsenz
2011/0045446 A1   2/2011  Glaser et al.
2013/0183640 A1*  7/2013  Comtois .......................... 434/59

OTHER PUBLICATIONS

International Search Report and the Written Opinion of the International Searching Authority, for PCT Application No. PCT/US/2013/032114, Issued Dec. 23, 2013.

"Developing Scenarios for Research into Upset Recovery Simulation" Authors Lars Fucke et al., AIAA Modeling and Simulation Technologies Conference Aug. 2-5, 2010, Toronto, Ontario Canada.

"Design and Evaluation of Spherical Washout Algorithm for Desdemona Simulator" Authors Mark Wentink, et al., AIAA Modeling and Simulation Technologies Conference and Exhibit, Aug. 15-18, 2005, San Francisco, California, USA.

* cited by examiner

MINIMIZING CORIOLIS-TUMBLING INTENSITY IN A CENTRIFUGE-BASED-FLIGHT SIMULATOR

CROSS-REFERENCE TO RELATED APPLICATIONS

This application claims the benefit of U.S. Provisional Patent Application No. 61/757,492, filed on 28 Jan. 2013, entitled "Centrifuge-Based-Flight Simulator," the entirety of which is hereby incorporated by reference.

BACKGROUND

Flight simulators are used by the military and civil-aviation industry as a low-cost alternative to actual flight time that allows pilots to gain valuable flight experience.

Although there are numerous devices used in flight simulation, these devices can all be categorized as either non-motion or motion trainers.

Within the category of motion trainers, the most commonly known device is referred to as a Stewart Platform, a six DoF platform ("DoF", pronounced as "doff" within the industry, means "degrees of freedom"), or hexapod platform. The six degrees of freedom are pitch, roll, yaw, heave, sway, and surge. This type of platform is a motion cueing device in that it gives the pilot the initial effect of a climb or dive, but due to limitations cannot replicate the complete flight envelope.

The other type of motion trainer is a Sustained G Device (SSGD) which generally has the pitch, roll, and yaw degrees of freedom as well as planetary motion. A SGD is essentially a centrifuge-based simulator.

Over the years, a six DoF platform has become a standard, and is required for the so-called Level D flight simulator standard of civil aviation regulatory authorities such as the Federal Aviation Administration (FAA) in the United States and the European Aviation Safety Agency (EASA) in Europe. This type of platform-based-stationary trainer provides the trainee with an experience of being in an airplane cockpit with high-resolution, wide-field visual displays of flight scenes. These simulators also attempt to replicate motion cues through the use of a piston-driven-motion system located underneath the platform of the simulator. The pistons position the simulator's platform at different angles, which are usually limited in range of motion. For instance, such simulators cannot angle themselves beyond ±45 degrees of pitch or ±45 degrees of roll. They also do not have the capability to impart positive or negative sustained G forces on a trainee, to turn upside down, or to impart other physiological stresses on the trainee.

Thus, a major drawback of such six DoF platform-based-stationary simulators, is that they cannot replicate a full 360 degree range of flight motion, nor impart sustained gravitational (G) forces on a pilot.

Unfortunately, most accidents resulting from a loss of airplane control in civil aviation—sometimes referred to as airplane "upsets"—involve airplane conditions outside the normal-flight envelope, such as pitch attitudes greater than 25 degrees nose up; pitch attitude greater than 10 degrees nose down; bank angles greater than 45 degrees; as well as increased G-forces imparted on the flight crew. It is these airplane movements coupled with increased gravitational forces, which often causes disorienting vestibular and tactile stresses on a pilot during real-world-flight conditions.

Thus, even if a pilot learns the correct "text book" procedures for recovery from a loss-of-control situation such as an upset condition in an airplane, a pilot who is trained on only six DoF platform-based-stationary simulators may not be able to properly execute control over an airplane in the real world. These pilots are not properly trained to adequately respond when confronted with the physiological stresses, external forces, and disorienting effects typically experienced by pilots during actual flight; especially flight conditions outside of the normal-flight envelope. Likewise, accidents and loss of control events in military aviation are often caused by the elevated G-forces that are experienced while maneuvering in today's high-performance, tactical, military aircraft. Although basic G-training is mandatory for most naval and air force pilots around the world, G-induced Loss of Consciousness (GLOC) remains a significant issue and driver behind many fatal military accidents.

On the other hand, centrifuge-based simulators are generally able to provide trainees with all of the benefits of six DoF platform-based-stationary simulators, but are also able to replicate full-multi-axis movements (for pitch, roll or yaw) coupled with actual elevated G-forces through the use of planetary motion. Thus, centrifuge-based simulators are able to address deficiencies that platform-based-stationary simulators cannot replicate, such as placing elevated G-forces and physiological stresses on a pilot, while permitting the pilot to also experience unrestricted multi-axis movements associated with actual flight. This unrestricted motion provides pilots with training to cope with physiological stresses during routine flight, and flight conditions outside of the normal-flight envelope.

Although centrifuge-based simulators are superior to piston-driven-stationary simulators—in that they allow for the replication of realistic G-forces and full freedom of motion—conventional-centrifugal simulators remain in a constant state of planetary motion when imparting G forces on a trainee.

This constant state of planetary motion in centrifuge-based simulators can create physiological challenges and perceptual artifacts in the trainees that a pilot would not experience in actual flight. These challenges may include an unpleasant sense of tumbling and disorientation, referred to as the "Coriolis Cross Coupling" or the "Coriolis illusion (collectively, CCC), which may provoke nausea, motion sickness, fatigue, visual disturbances, and other negative-motion illusions.

Minimizing or eliminating CCC in centrifuge-based simulators is desirable, but until the advent of the present invention, was unachievable.

SUMMARY

Various embodiments described herein minimize Coriolis-tumbling sensations in centrifuge-based simulators. For instance, in one example, a simulator transitions its rate of rotation to replicate flight conditions in which G-forces are unloaded on a trainee from a first-G-force value to a nominal-G-force value. But before reaching the nominal-G-force value, an intermediate-G-force value—which is more than the nominal-G-force value and less than the first-G-force value—is imparted and maintained on the trainee for a suitable duration of time. This intermediate-G-force value may be determined based on several factors including: (i) the angle of rotation of a gondola during the first-G-force value, (ii) the first-G-force value; and/or (iii) the length of time the trainee was exposed to the first-G-force value.

After the intermediate-G-force value is imparted and maintained for a suitable duration of time, G-forces imparted on the trainee may be further unloaded until nominal-G force value is reached. Transition from the intermediate-G-force value to the nominal-G-force value may be performed sub-threshold. That is, when transitioning from the intermediate-G-force value to the nominal-G-force value, rotation of the simulator may be decelerated at a rate below a generally perceptible threshold for human detection by the trainee.

In short, by imparting and maintaining an intermediate-G-force value on the trainee within a certain G-force range and for a suitable period of time before actually reaching a nominal-G-force value,—such as when transitioning between higher G-forces to lower or nominal G-forces—the trainee is unable to perceive whether or not he or she has reached the lowest nominal-G-force value. Further, this technique drastically minimizes Coriolis forces acting on the vestibular system which minimizes or eliminates the intensity of CCC, and related disorientation-abhorrence reactions experienced by trainees in human centrifuges. Still further, all these benefits are achieved with minimal or no loss of replicated flight fidelity experienced by the trainee in the simulator.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example Centrifuge-Based Simulator

Figure 1:
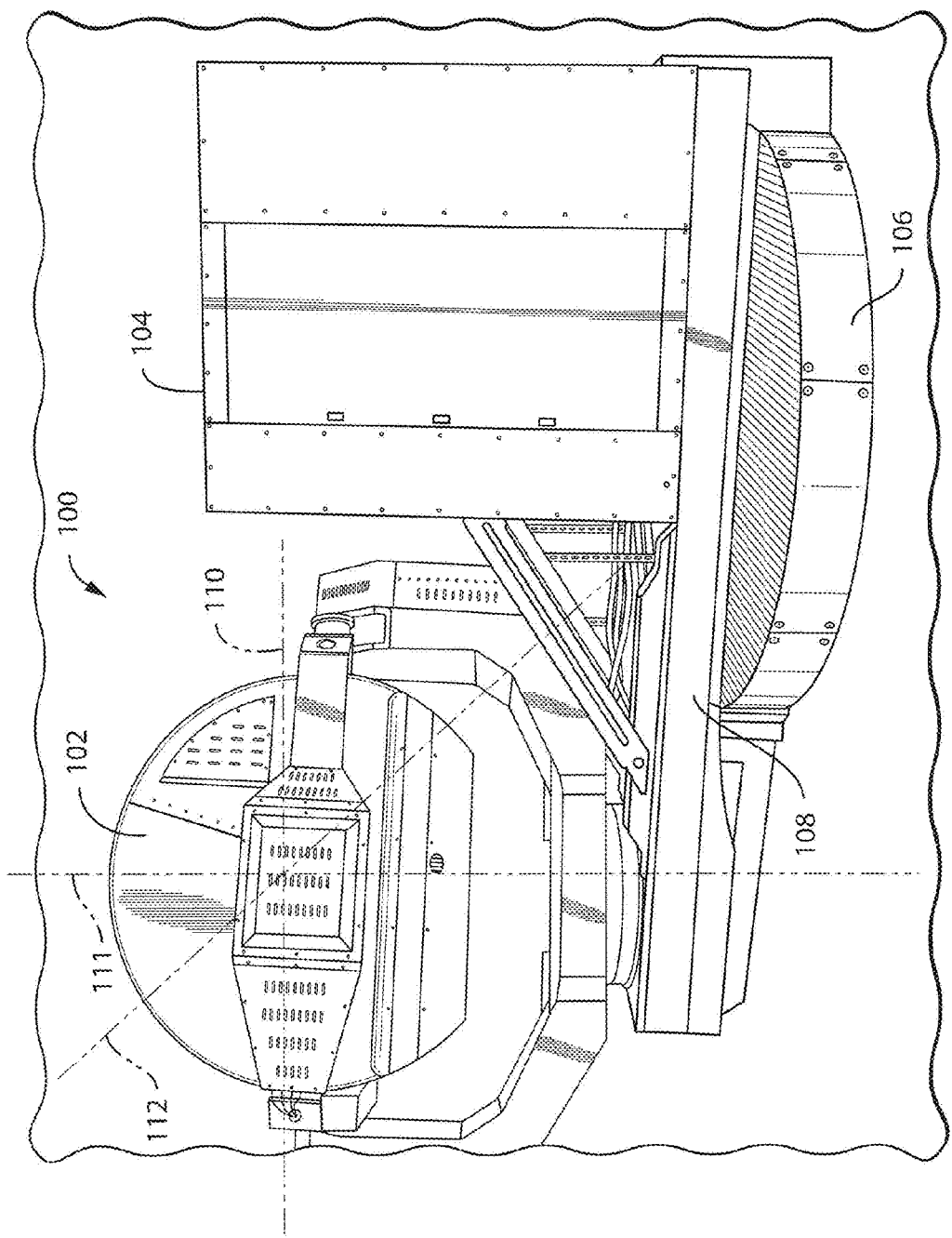
FIGS. 1 and 2 show example sustained-G centrifuge-based simulators.
Figure 2:
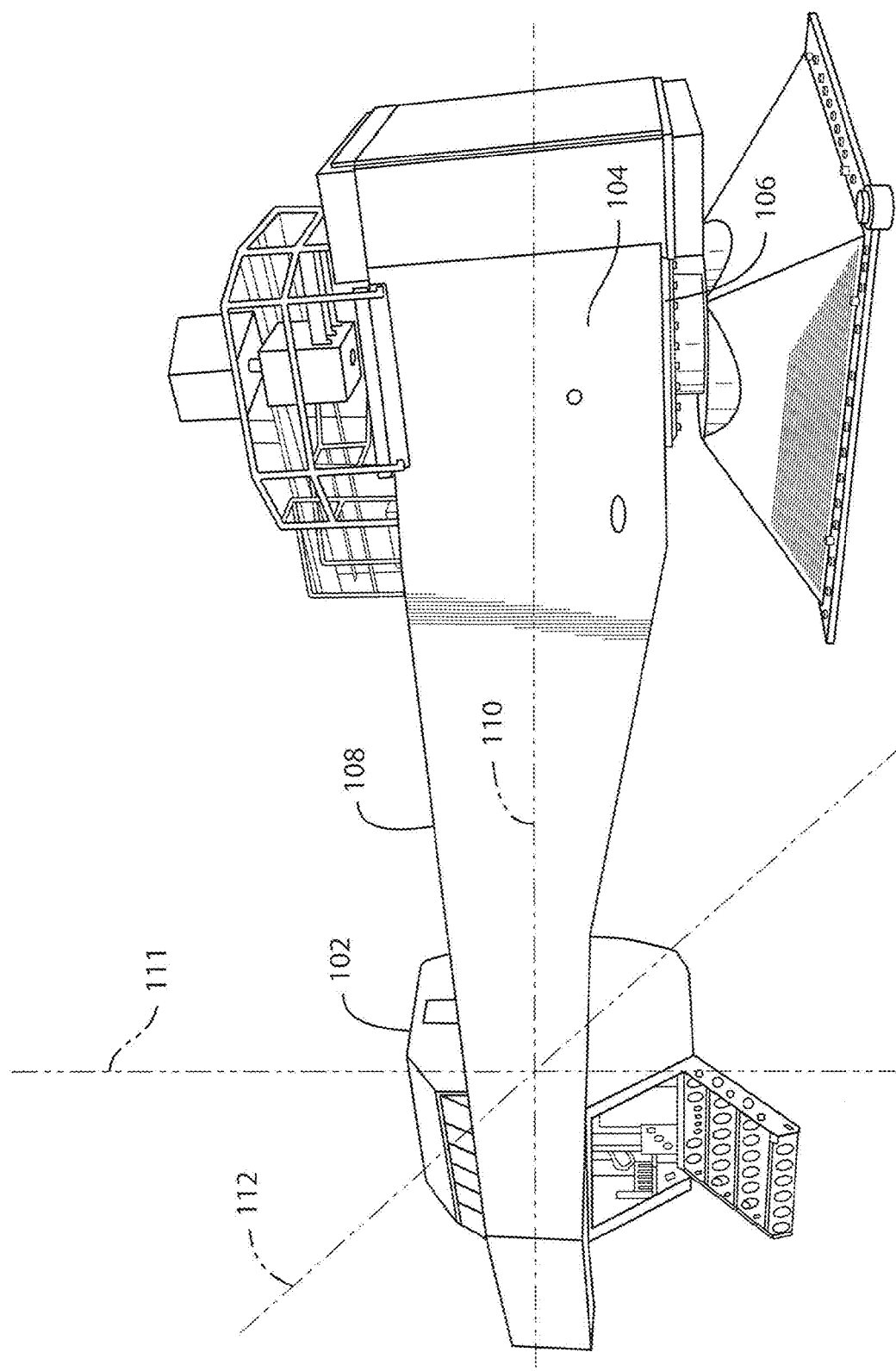

FIGS. 1 and 2 show example centrifuge-based simulators 100, which in the illustrative example includes a gondola 102, a motion unit 104, and an arm 108. Referring to FIGS. 1 and 2, gondola 102 is a compartment connected to a centrifuge arm 108. Gondola 102 is configured to spin around a central portion 106 of simulator 100 providing planetary motion, and impart enhanced gravity (G) forces on a pilot/trainee inside gondola 102. Actual G-forces imparted on the trainee are dependent upon the length of arm 108, a distance gondola 102 is from central portion 106, and a velocity gondola 102 spins around central portion 106 (i.e., planetary velocity). Gondola 102 is also configured to spin around an independent axes 110, 111 and 112 to replicating ±360 degrees of movement in yaw 111, pitch 112 and roll 110 axes.

Figure 3:
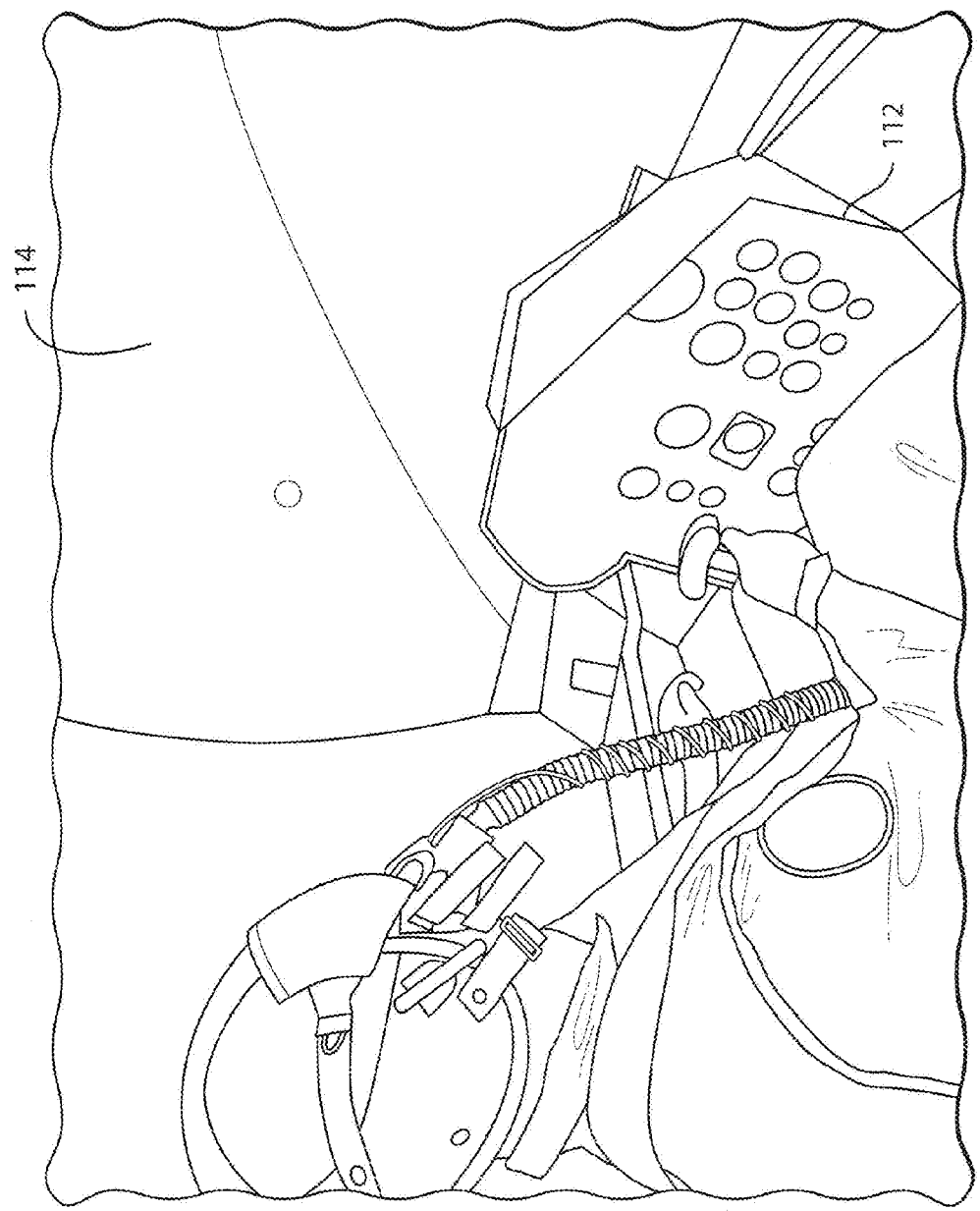
FIG. 3 shows a pilot in a cockpit of a virtual plane.

FIG. 3 shows an example view of a pilot inside of a gondola 102. As illustrated in FIG. 3, the inside of gondola 102 may include a physical layout 112 replicating seating, and flight control/instrument layout of an actual cockpit of a predetermined aircraft. Additionally, when seated inside gondola 102, interactive display 114 may fill a mock windows of a cockpit displaying virtual or superimposed video representing all aspects of a flight including takeoff, landing, and airborne flight visuals on a real-time basis. Thus, all aspects of a simulated aircraft flight environment can be replicated as a "virtual plane" in gondola 102 including G-forces, and ±360 degrees of movement in yaw, pitch and roll axes.

Typically, when immersed inside gondola 102, a trainee has no visual cues to the outside, and must rely fully on visual cues and instruments displayed in gondola 102. Thus, a trainee can fly a virtual plane and physically experience in-flight conditions substantially matching an actual-predetermined aircraft simulated by simulator 102.

In the illustrative example, the simulator in FIG. 1 is the GL 4000™, and the simulator in FIG. 2 is the ATFS-400™, both of Environment Tectonics Corporation, USA. Although the example GL 4000™ and ATFS-400™ are shown herein for illustration, any of the systems, methodologies and principles described herein are not limited to any particular centrifuge-based simulator, and may be applied generally to other simulator brands and models.

Figure 4:
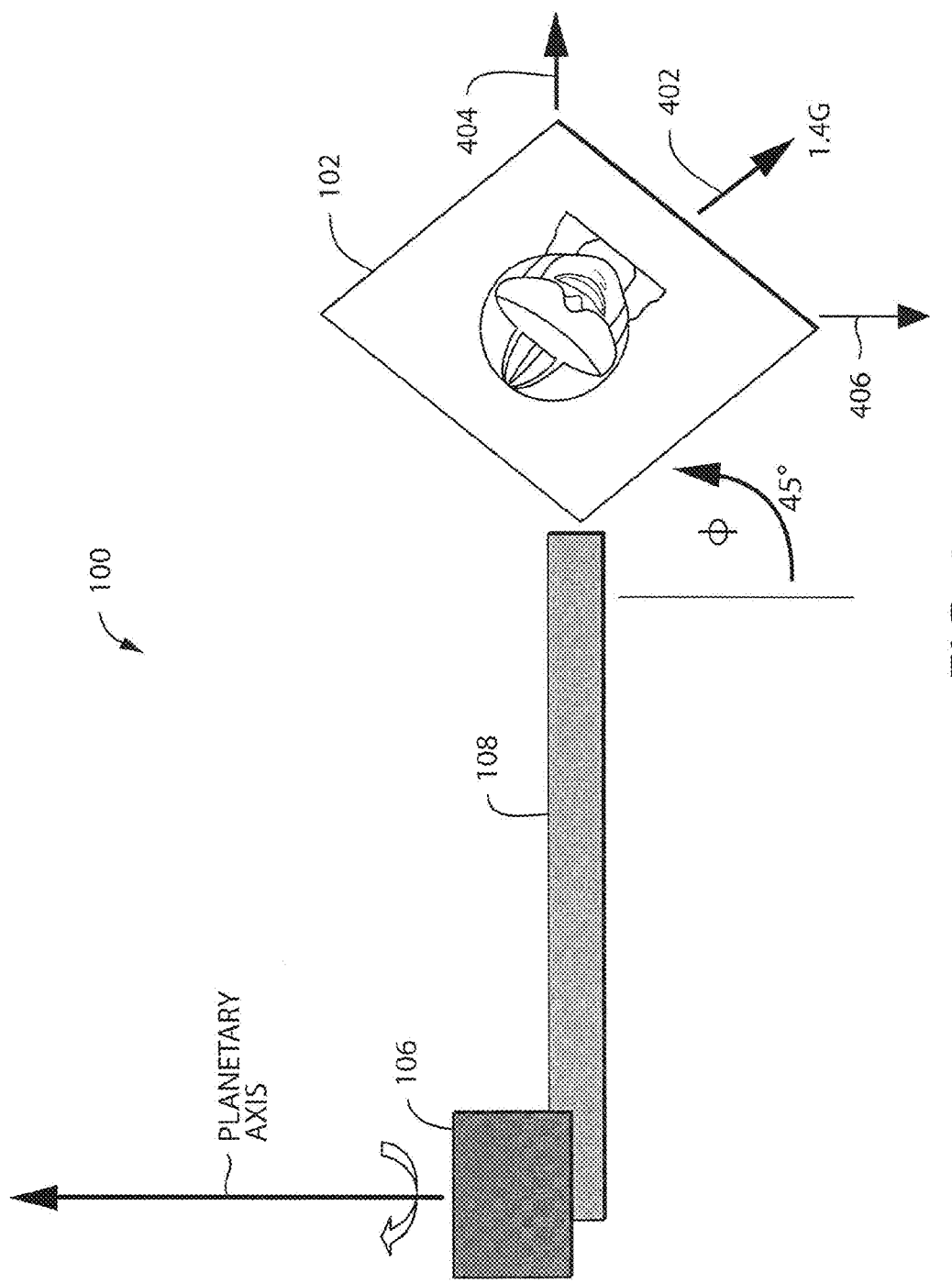
FIG. 4 shows logical view of a simulator with its cockpit spinning about a central planetary axis at a nominal-idle rate.

FIG. 4 shows a logical view of a simulator 100 with its gondola 102 (sometimes referred to as the cockpit) spinning about central axis 106 to generate G forces. A trainee sits in gondola 102. From this view, gondola 102 is spinning about central axis 106 at a nominal rate used to simulate straight and level flight. In some examples, it is advantageous to keep gondola 102 spinning in an idle fashion imparting about 1.4G (or more or less) on a trainee, although the trainee is able to rapidly adapt to the increased loading. As appreciated by those skilled in the art, idle speed may impart more or less than 1.4G depending upon the application and simulator. Generally a range of between 1G and 2G may be induced during idle spin of gondola 102.

As gondola 102 rotates about central axis 106, gondola 102 may rotate out and align with the resultant G-force vector 402. The resultant G-force vector 402 is the sum of the centripetal force vector 404 and the gravitational force vector 406. This angle of alignment with respect to gravity may be defined as the roll angle φ. FIG. 4 shows a roll angle φ of forty-five degrees, corresponding to 1.4Gs.

Figure 5:
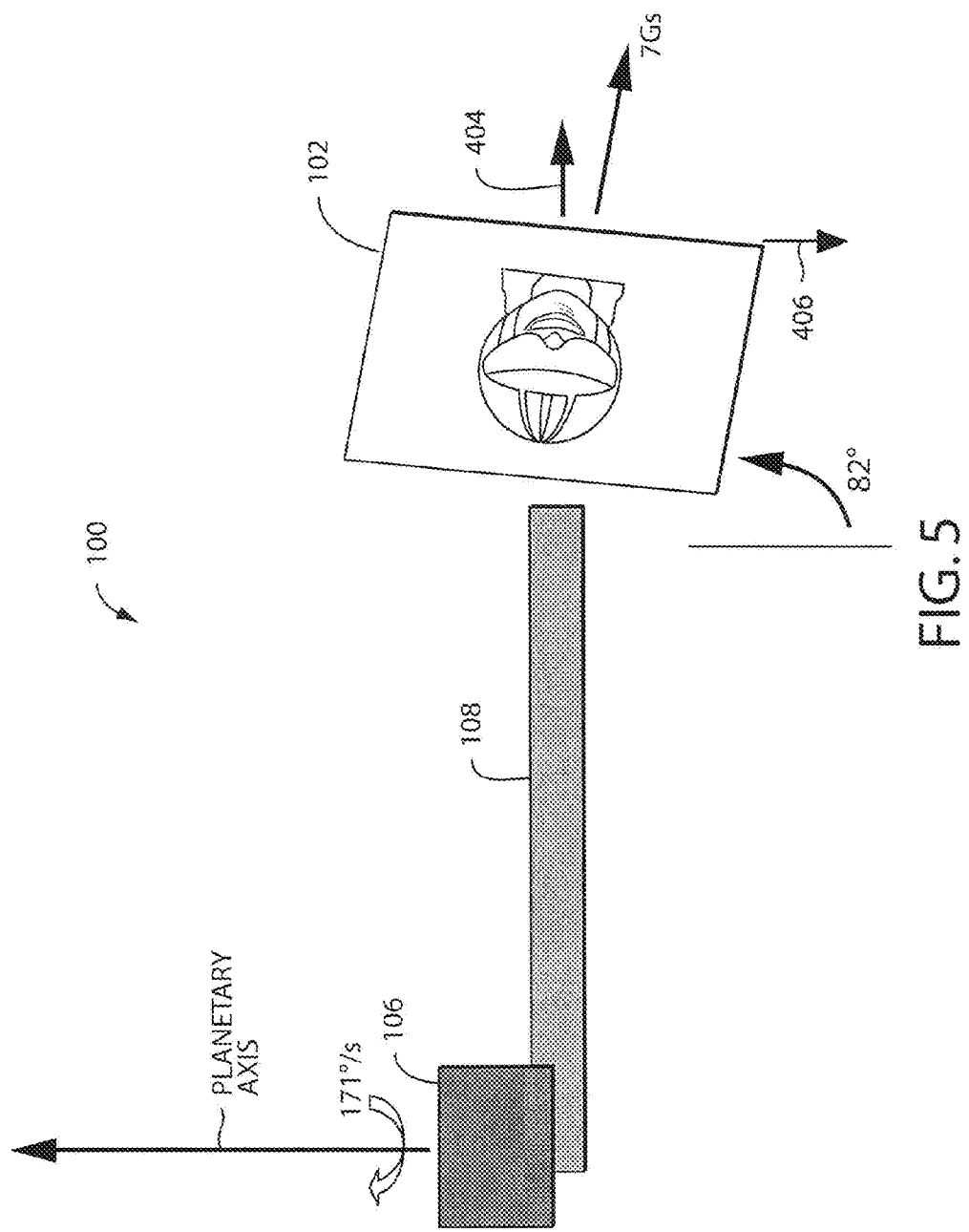
FIG. 5 shows logical view of the same simulator in FIG. 4, with its cockpit spinning about a central planetary axis at a heightened G-force rate.

FIG. 5 shows another logical view of simulator 100 with its gondola 102 spinning about central axis 106. Specifically, FIG. 5 shows an approximation of a roll angle of 82 degrees corresponding to a trainee experiencing 7Gs in the Z force direction with respect to the trainee's head. That is, when the trainee pulls 7G's the pilot feels a force equal to 7 Gz pointed into the seat (not shown in FIG. 5). Gondola 102 rotates around the central axis 106 at 171 degrees per second.

When the trainee transitions from the higher G level (such as 7G) to a nominal-G level (such as 1.4G) he experiences a strong sensation of forward tumbling (i.e., CCC) which is extremely disorienting as discussed above in the Background. The example systems, methods, and techniques described in this application are directed to solving this problem.

Example Computer System (Controller)

Figure 6:
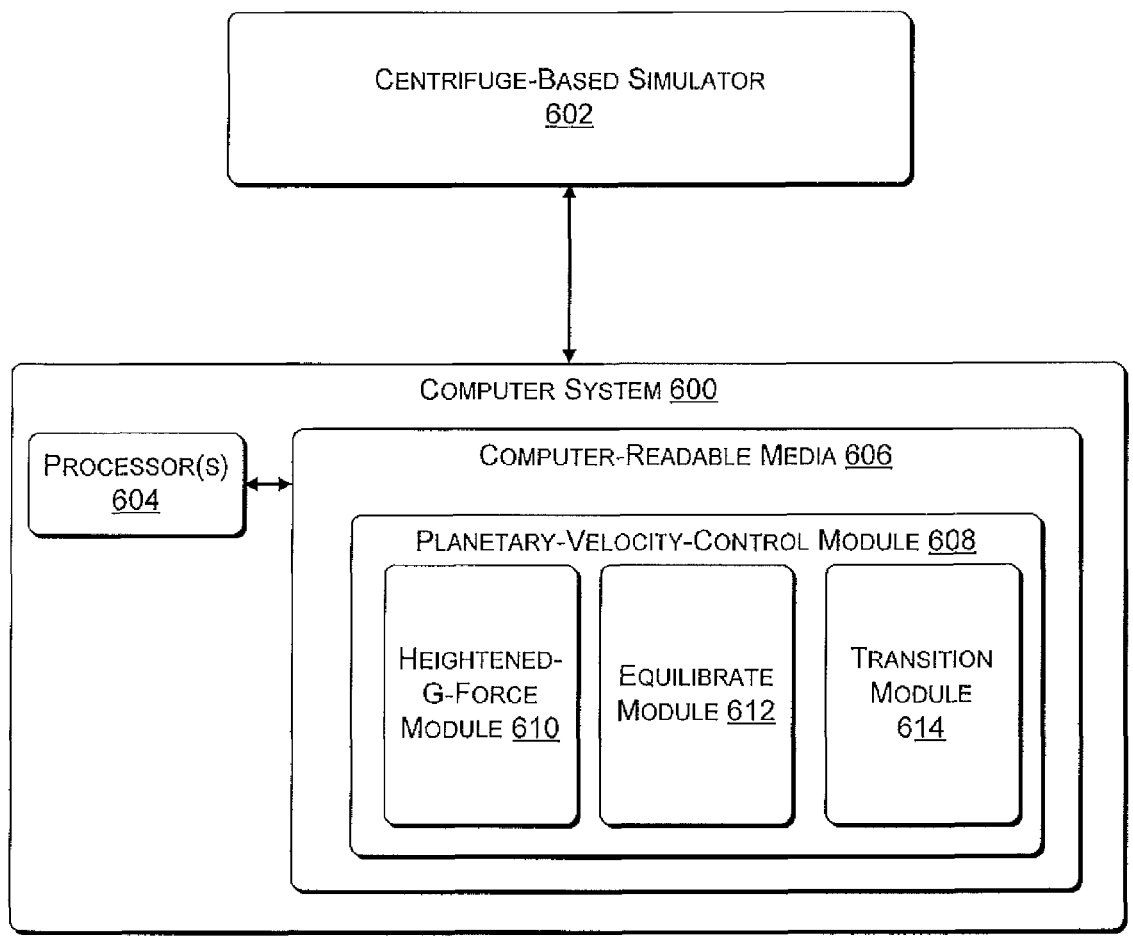
FIG. 6 is a block diagram illustrating a computer system used to control a centrifuge-based simulator.

FIG. 6 is a block diagram illustrating a computer system 600 used to control a centrifuge-based simulator 602 (such as simulator 100 shown in FIGS. 1 through 5). Computer system 600 may be a component of simulator 602.

Computer system 600 may represent any suitable computing device(s) having one or more processor(s) 604 and the ability to access a computer-readable media 606. Processor(s) 604 interact with computer-readable media 606 to execute instructions that control physical movement of simulator 602, as well as to facilitate a virtual-flight environment that coincides with physical movements of simulator 602 that replicate a particular actual plane.

Processor(s) 604 may be distributed in more than one computer system and over a network (not shown). Examples of computer systems 600 may include, but are not limited to, a server, a personal computer, special computer, distributed-computer systems, or other computing devices having access to processor(s) and computer-readable media. Further, although not shown, any number of system busses, communication and peripheral interfaces, input/output devices, and other devices may be included in computer system 600, as is appreciated by those skilled in the art.

Computer-readable media 606 may include any suitable computer-storage media including volatile and non-volatile memory, and any combination thereof. For example, computer storage media includes volatile and non-volatile, removable and non-removable media implemented in any method or technology for storage of information such as computer readable instructions, data structures, program modules, or other data. Computer storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory or non-transmission medium that can be used to store information for access by a computing device.

In other examples, the computer-readable media 606 may include communication media that may embody computer readable instructions, data structures, program modules, or other data in a modulated data signal, such as a carrier wave, or other transmission mechanism. As defined herein, computer-storage media does not include communication media.

Further, computer-readable media 606 may be local and/or offsite to computer system 600. For instance, one or more portions of, or all of data or code stored in computer-readable media 606, may be accessed from a computer-storage medium local to and/or remote to computer system 600, such as from a storage medium connected to a network.

Resident in computer-readable media 606 may be one or more operating systems (not shown), and any number of other program applications or modules in the form of computer-executable instructions and/or logic which are executed on processor(s) 604 to enable processing of data or other functionality.

Example-Planetary-Velocity Control Module

Computer system 600 is configured with a planetary-velocity-control module 608 maintained in computer-readable media 606. In one example, planetary-velocity-control module 608 may be implemented as code in the form of computer-readable instructions that execute on one or more processors 604. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application. Such code stored in computer-readable media 606 may be implemented across one or more servers in a cloud computing environment, on a local device, or on a combination of both. The following discussion does not limit the implementation of code stored in computer-readable media 606 to any particular device or environment.

Planetary-velocity-control module 608 may include components contained in computer-readable media 606. In one example, planetary-velocity-control module 608 includes: a heightened-G-force module 610, an equilibrate module 612, and a transition module 614.

Example heightened-G-force module 610 facilities a mode of operation of simulator 602 in which planetary velocity exceeds a minimum threshold for imparting heighted G-forces (i.e., uploading G-forces) on a trainee in gondola 102 (such as shown in FIGS. 1-5) while operating a virtual plane within simulator 602. Specifically, heightened-G-force module 610 instructs simulator 602 to rotate its gondola around its center at a rate of rotation that physically imparts G-forces approximately greater than about 1-to-1.4 G-forces on a trainee in gondola 102 during operation of simulator 602. For instance, referring to FIGS. 1 and 2, as gondola 102 starts to spin faster about the central axis 106, this causes the gondola 102 to roll which aligns the resultant G-force (Gz) vector aimed down the pilot's spine, compressing him into the seat.

Load factor is typically measured in multiples of force of gravity or "G's". For instance, if an airplane is generating twice as much lift as its weight it would then be experiencing a load factor of 2 or pulling 2 G's.

Referring back to FIG. 6, when in a heightened-G-force mode of operation, heightened-G-force module 610 may also cause simulator 602 to replicate a plurality of flight conditions in which a pilot may experience greater-load factors. Such flight conditions may include taking off, landing, banking, encountering severe weather, encountering wake turbulence, experiencing a flight malfunction or some other condition possibly caused by the pilot, which if occurring in the real world, would cause approximately more than one G-force to be imparted on a pilot flying an actual plane.

When in a heightened-G-force mode of operation, simulator 602 may continue to move ±360 degrees of movement in yaw 111 (FIGS. 1 and 2), pitch 112 and roll 110 axes, in addition to the planetary movement of gondola 102 (FIGS. 1, 2, 4, & 5).

When in an unloading G-force mode of operation, example equilibrate module 612 instructs simulator 602 to replicate a plurality of flight conditions while decreasing rotation of simulator 602 so it eventually imparts between about 1 G-to-1.4G forces on the trainee. Example flight conditions that may cause the unloading of G-forces (if at a higher G-force level beforehand) includes: a return to straight-level flight, return from a wide turn, or other conditions such as non-turning ascents or descents.

When in an unloading G-force mode of operation, equilibrate module 612 also instructs simulator 602 to rotate the arm 108 (FIGS. 1 and 2) about the central axis 106 (FIGS. 1 and 2) to impart an intermediate-G-force level or value on the trainee in the gondola 102 (FIGS. 1, 2, 4, & 5), and maintain this level of force on the trainee for a suitable duration of time. As will be explained in more detail, and will become more apparent to those of ordinary skill in the art after having the benefit of reading this disclosure, the actual intermediate-G-force level imparted on the trainee as well as a suitable duration of time for maintaining this force may vary.

For example, the intermediate-G-force value may be determined based on several factors including: (i) the angle(s) of rotation of the gondola (i.e. cockpit) experienced by a trainee during uploading G forces, (ii) the G-force value(s) (such as a maximum average value) experienced by a trainee during uploading G forces; and/or (iii) the length of time (i.e., window) the trainee was exposed to the uploading G-force values before transitioning to an unloading G-force mode of operation. The intermediate-G-force value may also vary depending on a desired reduction level of CCC on the trainee.

In one example, determining an intermediate-G-force value, and thus gondola roll angle $\phi$, is governed by the following equation:

$$\left(1 - \frac{\int_{\varphi_g}^{\varphi_{idle}} \sqrt{\frac{\tan(\varphi)}{r_{Cent}}} \cos(\varphi) d\varphi}{\int_{\varphi_g}^{\varphi_{idle-new}} \sqrt{\frac{\tan(\varphi)}{r_{Cent}}} \cos(\varphi) d\varphi}\right) \cong \Delta CCC$$

So, equilibrate module 612 instructs simulator to maintain a G-force (intermediate-G-force value or level) for a suitable length of time while a trainee unloads G-forces approaching a neutral or nominal G-force condition replicating a stationary position, such as level flight.

By temporary stopping at the intermediate-G-force value for a suitable duration rather than proceeding, without delay, to a nominal 1G-to-1.4G idle level, equilibrate module 612 allows a trainee more time to equilibrate his vestibular system, before the cockpit actually reaches a nominal G-force level. This technique vastly reduces or eliminates CCC effects on the trainee. Yet, the trainee is unable to perceive he has not fully returned the nominal-G-force level, and is actually spinning at a G-force that is greater than the nominal-G-force level, but less than a maximum G-force experienced by the trainee while the simulator was in the heightened-G-force mode of operation.

When in a transition mode of operation, example transition module 614 instructs simulator 602 to ramp-down its rate of rotation from a rate corresponding to the intermediate-G-force value imparted on the trainee to a nominal-G-force value. That is, after the intermediate-G-force value is imparted and maintained for a suitable duration of time, transition module 614 instructs the simulator to unload G-forces until a nominal-G force value (or other suitable G-level) is reached. Transition from the intermediate-G-force value to the nominal-G-force value may be performed sub-threshold. That is, when transitioning from the intermediate-G-force value to the nominal-G-force value, rotation of the simulator may be decelerated at a rate below a generally perceptible threshold for human detection by the trainee.

Put differently, decelerating of the rotation of the flight simulator is performed at a rate which is generally below a perceptible threshold for human detection. For instance, when the transition mode of operation is triggered, transition module 614 instructs simulator to rotate the gondola 102 (FIGS. 1, 2, 4, & 5) about the central axis 106 (FIGS. 1 & 2) in such a manner that all forces and rotations acting on the trainee are at a level below the human threshold for detection (see, i.e., Groen, J. J., Jongkees, L. B. W. "The threshold of angular acceleration perception," *J. Physiol* 107, 1-7 1948) (incorporated herein by reference)). Because the deceleration is below the threshold for human detection (i.e. "sub threshold"), the trainee/pilot is generally unaware that he or she is no longer rotating at the intermediate-G-force level. In other words, the trainee cannot perceive a difference between the intermediate-G-force level and the nominal-G-force level.

As appreciated by those skilled in the art, after having the benefit of this disclosure, optimum deceleration and transition rates to accomplish undetectable transition between modes of operation will vary in each simulator, and other factors, such as flight conditions.

So, a trainee operating a virtual plane within the simulator does not necessarily sense whether there is a change in planetary movement and roll angle $\phi$ of the simulator when transitioning between an intermediate-G-force level and a nominal-G-force level. In addition, this process of transitioning between an intermediate-G-force level and a nominal-G-force level also keeps the Coriolis forces generated during the transition at a level below the threshold for human detection.

The insertion of an intermediate-G-force level after offloading of G-forces toward a nominal-G-force, and the transitioning sub-threshold to nominal-G-force from the intermediate-G-force level, is systematically employed by system 600 (FIG. 6) to minimize or eliminate CCC in centrifuge-based simulators.

Figure 7:
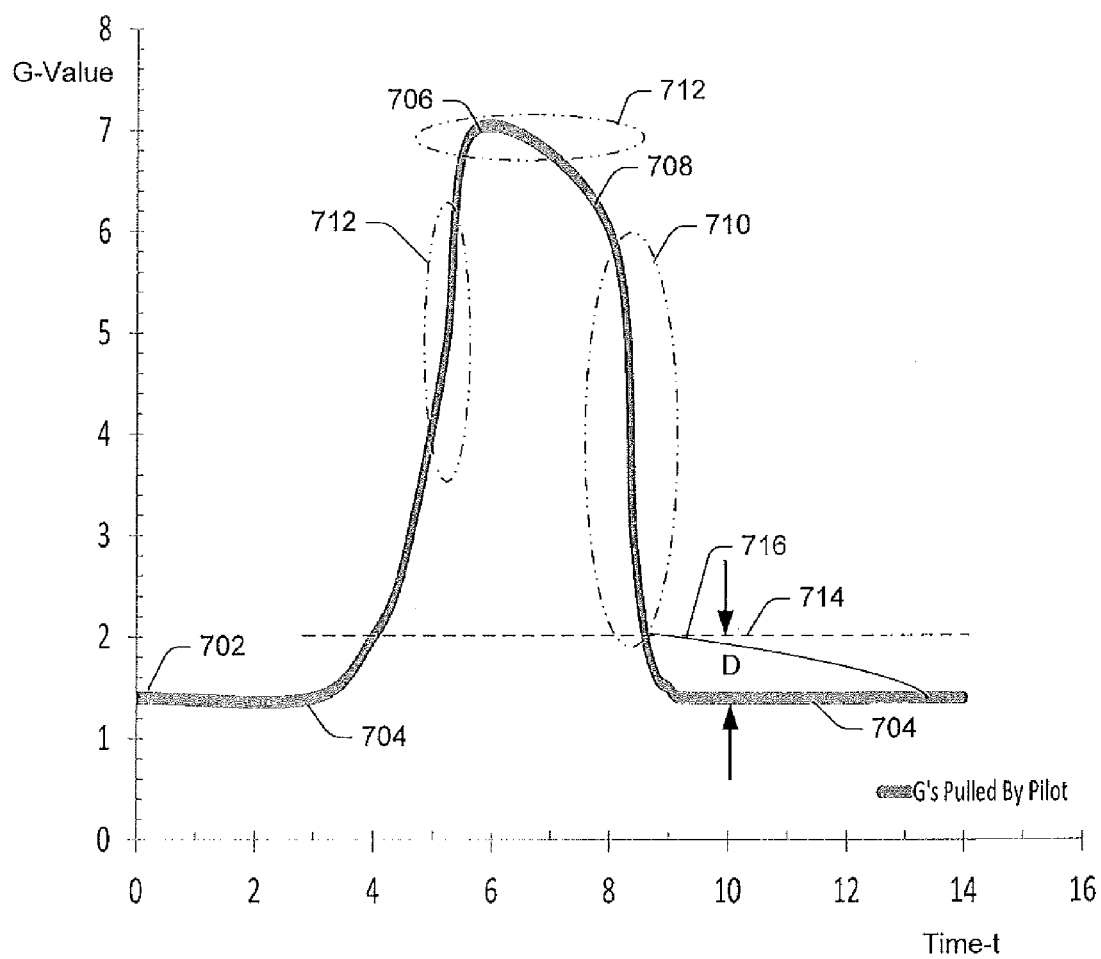
FIG. 7 is a graph depicting an example profile of G-forces imparted on to a trainee flying in a simulator.

FIG. 7 shows a graph representing an example profile of G-forces imparted on to a trainee flying in a simulator such as described above. The G-forces are intended to substantially match actual G-forces a pilot may experience when flying a predetermined aircraft according to the same temporal and behavior position of a virtual plane following a flight trajectory.

At point 702, where t=0 the simulator imparts a nominal G-force of between about 1G-to-1.4G on the trainee. As appreciated by those skilled in the art, the nominal G-force may exceed this range depending on the simulator, and elevation of the simulator.

At point 704, where t=3.5, the simulator operates in heightened G-force state in which a G-forces are increasingly loaded on the trainee. The centrifuge starts to spin faster and the gondola (cockpit) starts to roll in order to align the G vector such that it is aimed down the pilot's spine, compressing him into the seat. For example, suppose a trainee is flying a virtual plane that is sharply banking in a centrifuge-based simulator. That is, when the virtual plane banking, simulator 602 (FIG. 6) imparts a heightened-G-force on the trainee in the gondola 102 (FIGS. 1, 2, 4, and 5). These heightened-G-forces are intended to substantially match actual G forces a pilot may experience when flying a predetermined aircraft according to the same temporal and behavior position of a the virtual plane following flight trajectory.

At point 706, at about time t=6 seconds, the pilot reaches a maximum G-force value of about 7Gs. The centrifuge now spins at its fastest according the example envelope depicted in FIG. 7, and the gondola (cockpit) reaches a maximum roll angle.

At point 708, at about time t=8 seconds, the simulator starts to transition its operation to unloading G-forces on the trainee. That is, the simulator decelerates its planetary rotation and the gondola begins to roll toward a more upright position. For instance, suppose a virtual plane flown by the trainee exits the turn and transitions to straight and level flight. During this portion of the flight trajectory, unloading of G-forces on the trainee occurs.

After point 708, between about time t=8 and t=8.5 seconds rapid unloading of G forces occurs as shown in 710. Without the example systems, methodologies and techniques described in this disclosure, the trainee may experience a severe-artificial tumbling sensation, and other CCC effects.

Accordingly, simulator 602, and specifically example equilibrate module 612 (FIG. 6) tracks the G-forces imparted on the trainee during one or more durations of time (i.e., windows) 712. These G-forces tracked may include one or more G-forces over the length of the window. The G-force values may include a maximum G-force, an average calculated from a plurality of G-force values over a specific duration, and various other suitable ways of calculating a representative G force experienced by the trainee over a duration of time such as windows 712. In addition, the size of each window may vary, and can move as the trainee maneuvers the virtual plane according to virtual trajectory. Thus, in one example, equilibrate module 612 determines one or more G-force values that describe the G-level imparted on the trainee between t=3.5 and t=6 seconds.

This G-force value is then used by equilibrate module 612 to determine an intermediate-G-force level 714 to impart on the trainee and maintain this level over a suitable duration of time. That is, as the simulator decelerates its rotation a highest G-force at point 706 toward a nominal G-force 704, an intermediate-G-force level 714 is imparted on the trainee for a suitable duration. The intermediate-G-Force level 714 is less than the highest G-force 706 and more than the nominal-G force 704.

The difference D between the intermediate-G-Force level 714 and the nominal-G force 704 is generally not perceived by the trainee, because the trainee has unloaded from such a high-G level. Accordingly, the trainee perceives the intermediate-G-force level as corresponding to the nominal-G force level despite the intermediate-G-Force level being greater than the nominal-G force.

After a suitable duration of time, at about point 716, the simulator transitions from intermediate-G-Force level 714 to nominal-G-force level 704. Here, the remaining G forces are unloaded from the trainee to a level of about 1.4G or less. Generally the decelerating rotation of the simulator occurs at a rate that is below a generally perceptible threshold for detection by the trainee. Additionally, rates of rotation may slightly exceed acceptable thresholds of deceleration. Such rates of rotation—although on the cusp of, partially exceeding, or slightly exceeding the threshold of human perception—may also be considered within the realm of being generally below the perceptible threshold of human detection in some situations.

As appreciated by those skilled in the art having the benefit of the disclosure, the above example with reference to FIG. 7 is only one of many different ways in which different modes of operation, and a plurality of configurable flight conditions may be implemented/triggered with corresponding G-forces; all of which are intended to match actual G forces occurring in a predetermined aircraft during the same flight conditions.

Example-Illustrative Process

Figure 8:
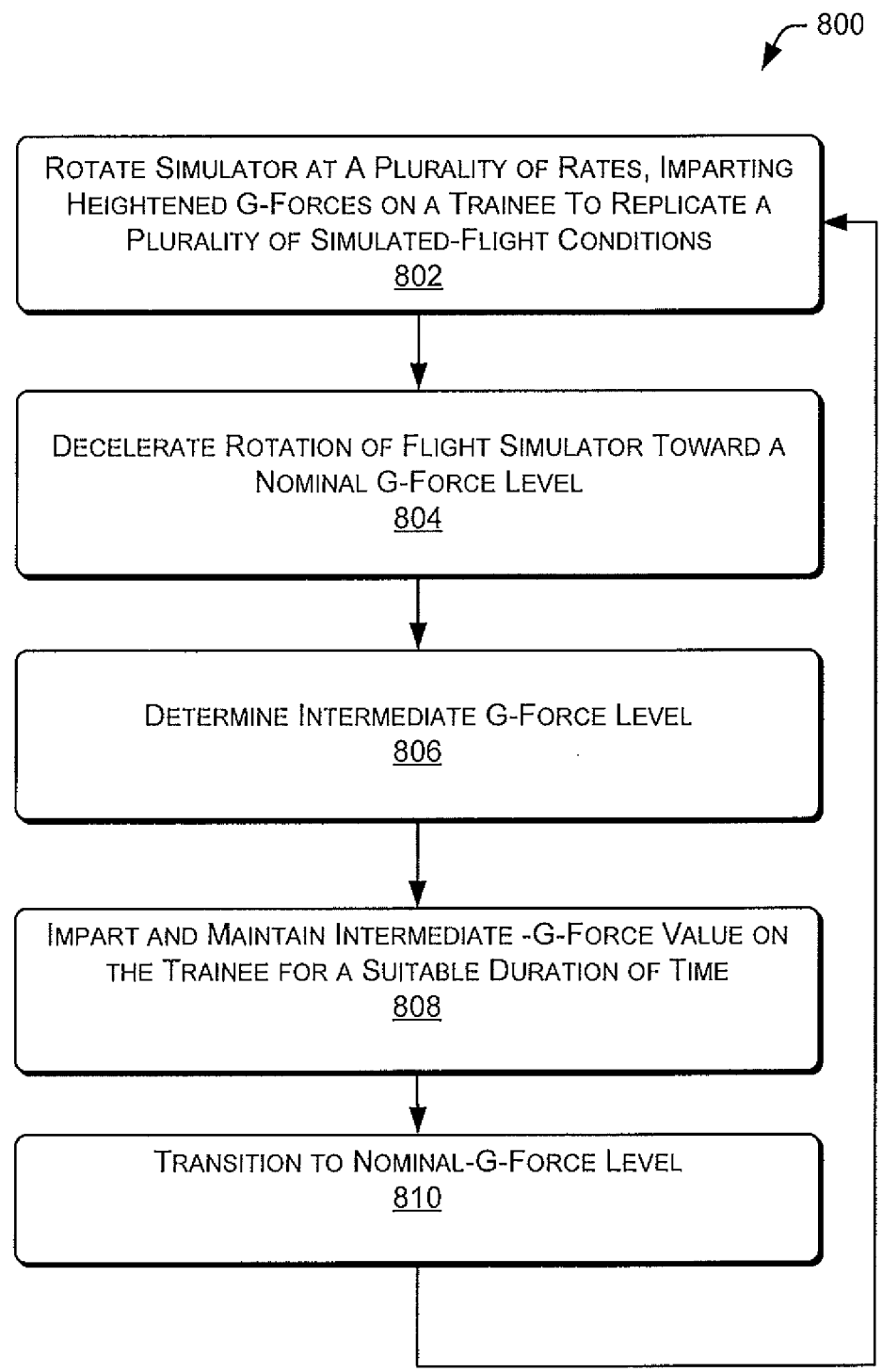
FIG. 8 shows an illustrative process for controlling a centrifuge-based simulator, according to various embodiments.

FIG. 8 shows an illustrative process 800 for controlling a centrifuge-based simulator, according to various embodiments. Process 800 may be described with reference to FIGS. 1 through 7.

Process 800 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure.

At 802, a simulator simulates a plurality of first-flight conditions by rotating the simulator at rate of rotation of that physically imparts heightened G-forces. And, after simulating at least one of the plurality of first-flight conditions, process 800 proceeds to 804.

At 804, assuming simulator is next going to simulate one of a plurality of second-flight conditions, the planetary velocity of the simulator is decreased over a period of time approaching a nominal-force level. That is, G-forces are unloaded on a trainee from a first-G-force value toward a nominal-G-force value.

At 806, an intermediate-G-force value may be determined based on several factors including: (i) the angle of rotation of a gondola during block 802, (ii) a highest-G-force value imparted on the trainee in block 802; and/or (iii) the length of time the trainee was exposed to this G-force value.

At 808, simulator imparts and maintains an intermediate-G-force value on the trainee for a suitable duration of time.

At 810, a simulator further unloads G-forces on the trainee while transitioning from the intermediate-G-force value to the nominal-G-force value. In one example, transition is performed by controlling the rate of velocity, which is generally below a perceptible threshold for human detection by the trainee while operating the simulator (movement of the simulator is generally performed at sub-threshold levels of human detection).

More detailed examples, techniques, and sample equations and charts to implement the systems and methods disclosed are described below.

The current Gz state of an example centrifuge-based simulator drives the following equations and a variable-idle algorithm:

a. Current Gondola Roll Angle:

$$\varphi_g = \mathrm{acos}\!\left(\frac{1}{G_z}\right)$$

b. Angular velocity change of endolymph due to Coriolis force: This is the variable to target to minimize CCC tumbling intensity, $$CCC_{\vec{\omega}} = \int_{\varphi_g}^{\varphi_{idle}} \sqrt{\frac{\tan(\varphi)}{r_{Cent}}} \cos(\varphi) d\varphi$$

It is possible to calculate the tumbling velocity for both a new idle roll angle, $\phi_{idle\text{-}new}$, and compare them against a standard idle roll angle $\phi_{idle}$, where $\phi_{idle}$ is equal to approximately 45° (at current 1.4 Gz).

To obtain the variable idle level (i.e., intermediate-G-force value) that will give a set percentage reduction of CCC intensity ($\Delta CCC$). To calculate this value, the following equation for $\phi_{idle\text{-}new}$ may be solved.

$$\left(1 - \frac{\int_{\varphi_g}^{\varphi_{idle}} \sqrt{\frac{\tan(\varphi)}{r_{Cent}}} \cos(\varphi) d\varphi}{\int_{\varphi_g}^{\varphi_{idle\text{-}new}} \sqrt{\frac{\tan(\varphi)}{r_{Cent}}} \cos(\varphi) d\varphi}\right) \cong \Delta CCC$$

Because this formula cannot be solved easily, it is also possible to use the polynomial curve coefficients (Table 1 through Table 6, below) to determine the value of $\phi_{idle-new}$ based on a desired percent reduction of CCC ($\Delta CCC$). These curves have been calculated for a 40%, 50%, 60%, 70%, 80% and 90% reduction target.

Polynomial Curves to Calculate Variable Idle Values: Numeric integration is required to solve the Angular velocity change of endolymph due to Coriolis force equation (reproduced below).

$$\left(1 - \frac{\int_{\varphi_g}^{\varphi_{idle}} \sqrt{\frac{\tan(\varphi)}{r_{Cent}}} \cos(\varphi) d\varphi}{\int_{\varphi_g}^{\varphi_{idle-new}} \sqrt{\frac{\tan(\varphi)}{r_{Cent}}} \cos(\varphi) d\varphi}\right) \cong \Delta CCC$$

Figure 9:
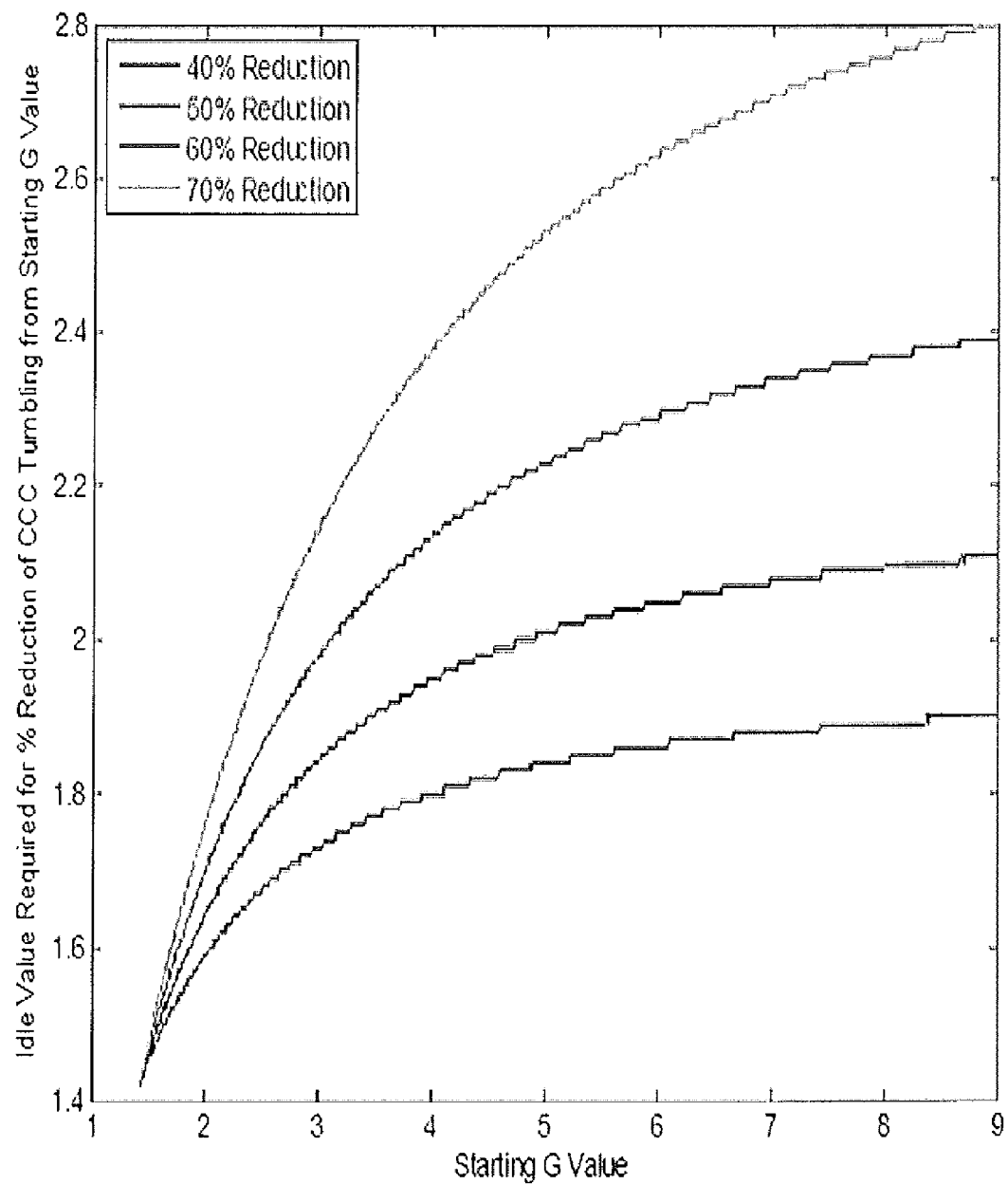
FIG. 9 is a chart depicting example numerical results for Coriolis reductions between 40% and 70%.
Figure 10:
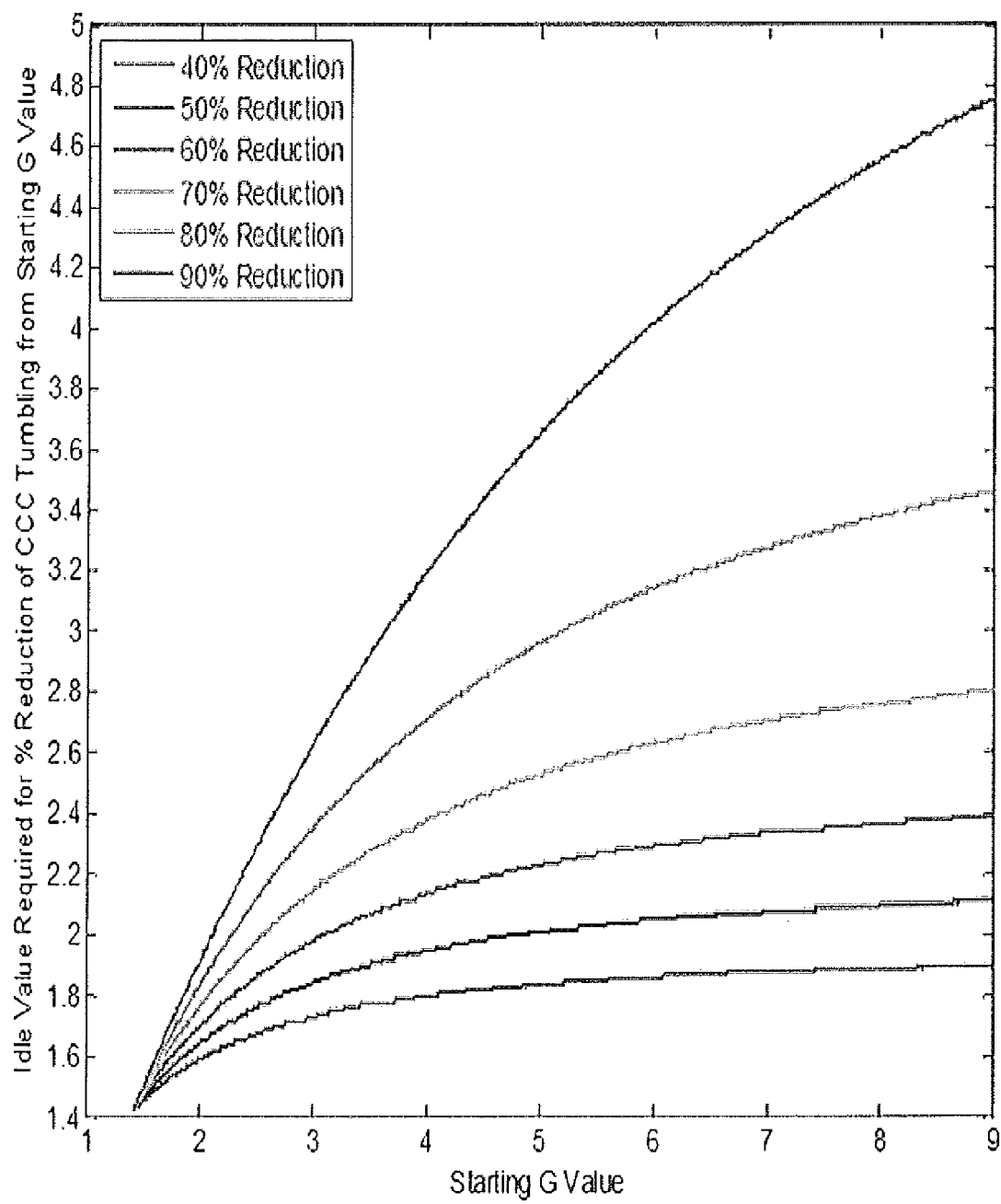
FIG. 10 is a chart depicting example numerical results for Coriolis reductions between 40% and 90%.

To accomplish this a desired percent reduction is set of Coriolis tumbling, $\Delta CCC$, and the variable idle G level is calculated to meet this percent reduction, $\phi_{idle-new}$. This process is time and computationally intensive. To minimize this in one example all numerical integration is predetermined and fits the numerical curves to $7^{th}$ order polynomial functions. The numerical results for Coriolis reductions between 40% and 70% are depicted in FIG. 9. The numerical results for Coriolis reductions between 40% and 90% are shown in FIG. 10.

Acceleration of Endolymph Due to Coriolis Force:

This is the variable that may be used to transition back from a new elevated idle level to the nominal-G-force 1.4G (idle). To ensure that this variable is below the human detection threshold for angular acceleration (defined below) for all values the simulator may transition back to nominal-G-force 1.4G level.

$$\vec{CCC_a} = \sqrt{\frac{\tan(\varphi)}{r_{Cent}}} \cos(\varphi) \frac{d\varphi}{dt}$$

Figure 11:
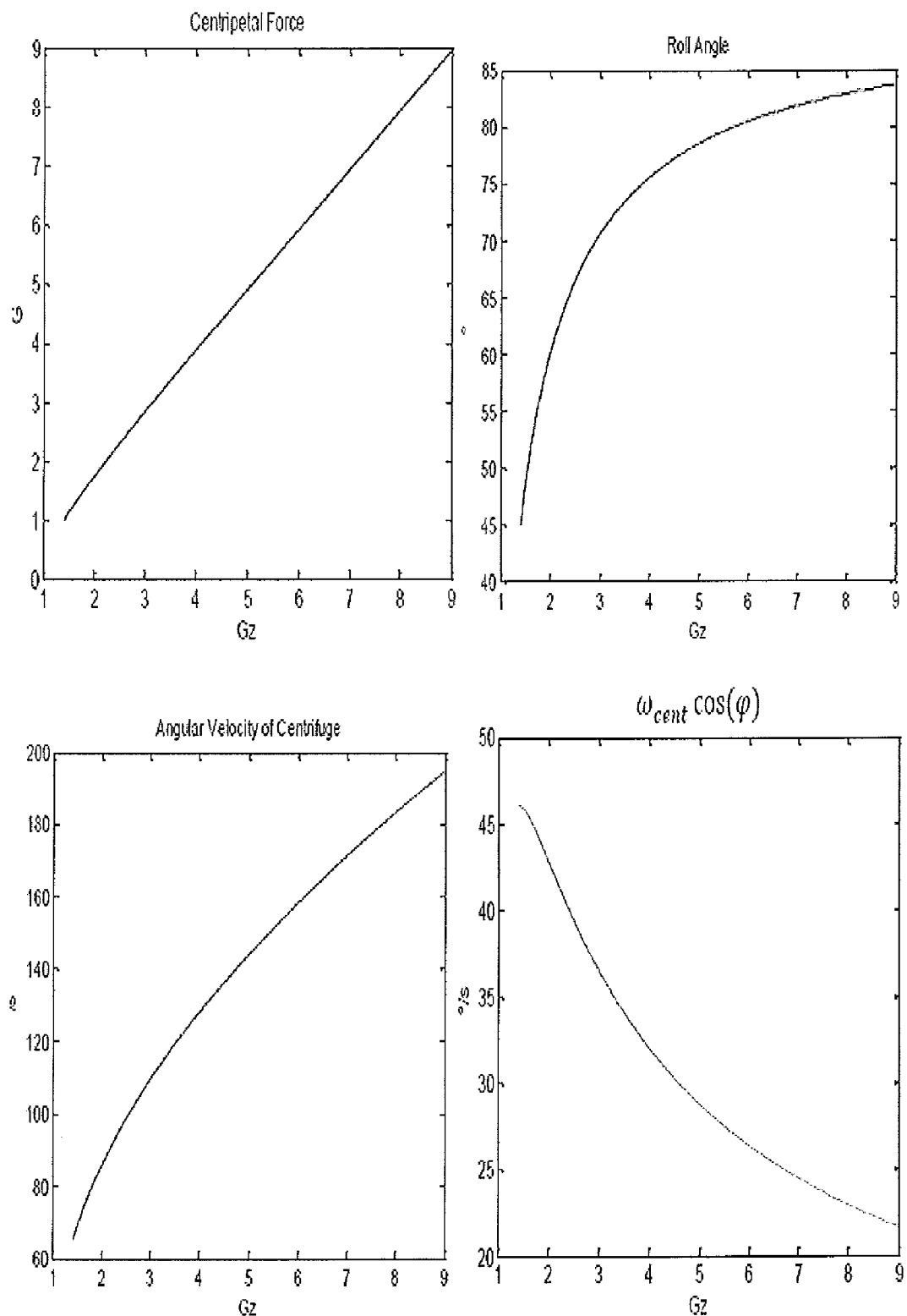
FIG. 11 is a chart showing the relationship between G-force and centripetal force, gondola roll angle, and the angular velocity of a centrifuge-based simulator.

This function must remain below $\vec{a_{SCC}}$ for the entire transition from idle-new to idle. A solution to this equation is provided in FIG. 11.

That is FIG. 10 shows plots of centrifuge planetary velocity, $\omega_{Cent}$, gondola roll angle, $\phi$, and the $\omega_{Cent} \cos(\phi)$ term of the equation for Coriolis acceleration acting on the canals (the equation is reproduced below for reference).

$$\vec{CCC_a} = \omega_{Cent} \cos(\varphi) \frac{d\varphi}{dt} = \sqrt{\frac{\tan(\varphi)}{r_{Cent}}} \cos(\varphi) \frac{d\varphi}{dt}$$

From this equation an offset curve may be determined based on the vestibular rotational threshold, $\vec{a_{SCC}}$, to ensure a transition from the elevated variable idle state to a lower-nominal idle state, and avoidance of additional motion artifacts and tumbling sensations.

Dynamic idle constants and parameter may be set or defined as follows: Free parameters and constants that must be set or defined:

a. $\Delta CCC$—Desired percent reduction of CCC tumbling velocity (0%→100%)

b. $\vec{a_{SCC}}$—Angular acceleration detection threshold (typical values found in the literature suggest that this value is between 0.5°/s² and 2.0°/s²).

c. $\tau_{window}$—Length of time window to search for local maximum or apply moving average filter. Should be based on the time constant of the semicircular canals, $\tau_{SCC}$, defined below.

d. $\tau_{idle}$—Length of time window to wait at elevated idle until we begin to transition back to nominal idle conditions e. $\tau_{SCC}$—Time constant of the semicircular canal endolymph-cupula dynamic system (typical values found in the literature suggest that this value is approx. 6 s)

FOR all time t during simulation
1. Calculate G state with one of three options
   a. Moving average with window size $\tau_{window}$
   b. Moving maximum with window size $\tau_{window}$
   c. Local maximum with new maximum that doesn't reset till we reach variable idle level
2. Translate G condition to Variable Idle Level with polynomial curves calculated above.
   a. Decide whether to use one curve or several curves which change depending on G calculated in step 2

Once G drops to new idle level wait $\tau_{idle}$ then slowly transition back to nominal 1.4 Gz idle governed by the acceleration equation calculated above. Finally, if interrupted during transition back to idle treat current Gz level as idle and continue the process seamlessly.

Each curve was fit to a $7^{th}$ order polynomial function. The coefficients and plots for each fit are shown below.

TABLE 1

Polynomial Parameters for 40% Reduction in CCC

| Coefficient | Value |
|---|---|
| $x^7$ | 4.07618768871725e−06 |
| $x^6$ | −0.000173085444781347 |
| $x^5$ | 0.00311500405259945 |
| $x^4$ | −0.0309165532429767 |
| $x^3$ | 0.184437407481518 |
| $x^2$ | −0.675105171431441 |
| $x^1$ | 1.47213563485892 |
| $x^0$ | 0.275874092965228 |

TABLE 2

Polynomial Parameters for 50% Reduction in CCC

| Coefficient | Value |
|---|---|
| $x^7$ | 5.71835270480240e−06 |
| $x^6$ | −0.000231319329834756 |
| $x^5$ | 0.00397602217251378 |
| $x^4$ | −0.0379241794386606 |
| $x^3$ | 0.219937527697441 |
| $x^2$ | −0.798008658780980 |
| $x^1$ | 1.78139480745473 |
| $x^0$ | 0.00610825517508345 |

TABLE 3

Polynomial Parameters for 60% Reduction in CCC

| Coefficient | Value |
| --- | --- |
| $x^7$ | 3.35936021082090e−06 |
| $x^6$ | −0.000145043336972327 |
| $x^5$ | 0.00267065393885931 |
| $x^4$ | −0.0274597811969633 |
| $x^3$ | 0.173568780138236 |
| $x^2$ | −0.699671702232750 |
| $x^1$ | 1.79131948713652 |
| $x^0$ | −0.109215178787704 |

TABLE 4

Polynomial Parameters for 70% Reduction in CCC

| Coefficient | Value |
| --- | --- |
| $x^7$ | 8.55865013601452e−07 |
| $x^6$ | −4.55789458770291e−05 |
| $x^5$ | 0.00101837887938562 |
| $x^4$ | −0.0126809024592745 |
| $x^3$ | 0.0981047467248308 |
| $x^2$ | −0.494618423843077 |
| $x^1$ | 1.63021059874826 |
| $x^0$ | −0.129430413740739 |

TABLE 5

Polynomial Parameters for 80% Reduction in CCC

| Coefficient | Value |
| --- | --- |
| $x^7$ | −9.72676973283362e−07 |
| $x^6$ | 3.25133916441169e−05 |
| $x^5$ | −0.000388827373813810 |
| $x^4$ | 0.00117733452311881 |
| $x^3$ | 0.0182645848567880 |
| $x^2$ | −0.239252288420503 |
| $x^1$ | 1.35701632456503 |
| $x^0$ | −0.0761328634352613 |

TABLE 6

Polynomial Parameters for 90% Reduction in CCC

| Coefficient | Value |
| --- | --- |
| $x^7$ | −3.52345854447574e−07 |
| $x^6$ | 1.48152248206185e−05 |
| $x^5$ | −0.000262216679149395 |
| $x^4$ | 0.00232644375778699 |

TABLE 6-continued

Polynomial Parameters for 90% Reduction in CCC

| Coefficient | Value |
| --- | --- |
| $x^3$ | −0.00647021850627881 |
| $x^2$ | −0.0848507152311780 |
| $x^1$ | 1.15731179549432 |
| $x^0$ | −0.0379902440782992 |

Figure 12:
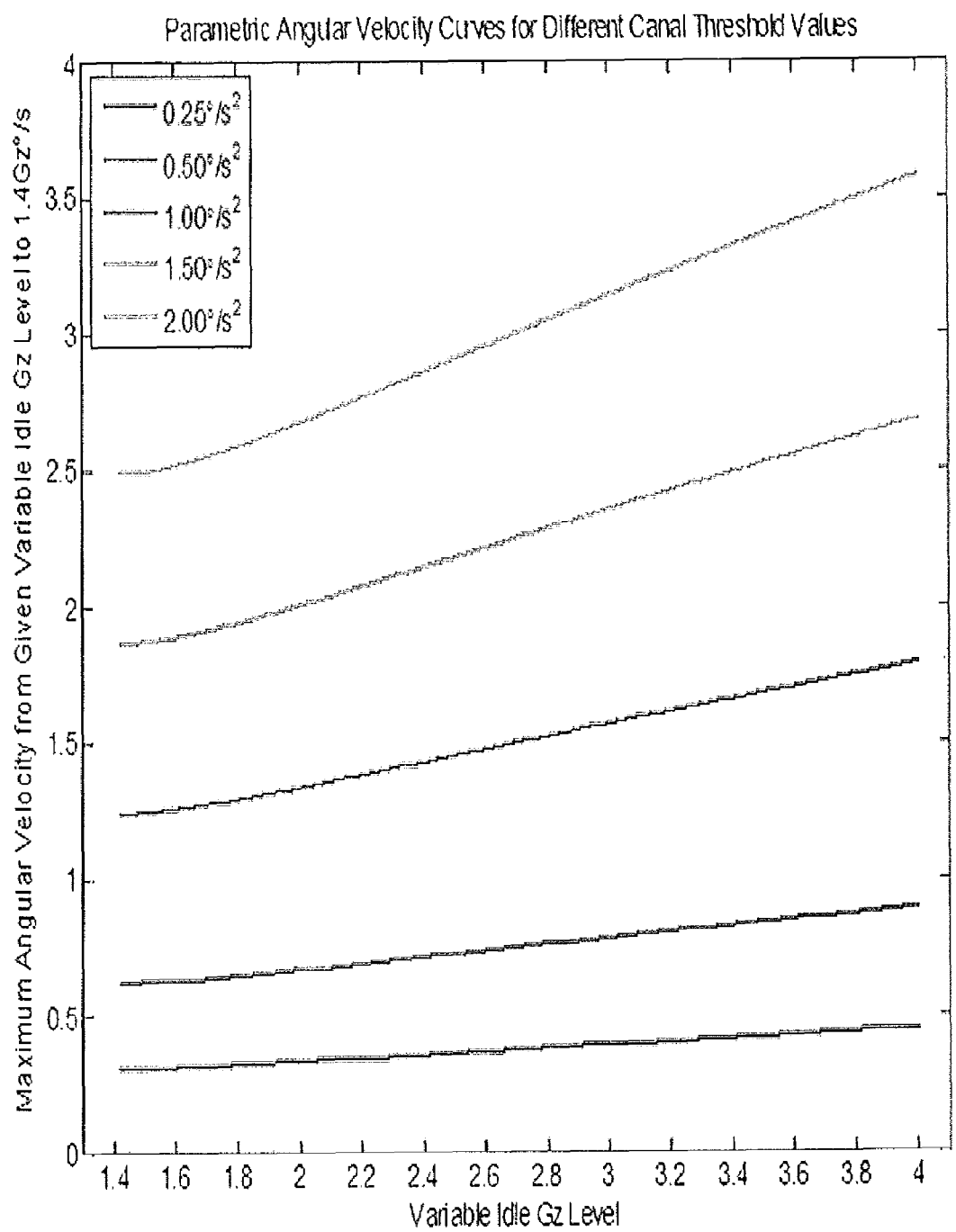
FIG. 12 shows roll angular velocity offset curves for vestibular thresholds, $\vec{a}_{SCC}$, of 0.25, 0.50, 1.0, 1.5 and 2.0°/s².

FIG. 12 shows roll angular velocity offset curves for vestibular thresholds, $\vec{a}_{SCC}$, of 0.25, 0.50, 1.0, 1.5 and 2.0°/s². The formula to calculate these curves is shown below.

$$\frac{d\varphi}{dt} = \frac{\vec{a}_{SCC}}{\sqrt{\frac{\tan(\varphi)}{r_{Cent}}\cos(\varphi)}}$$

As long as the roll angular velocity is below the selected curve, the pilot will not experience additional Coriolis tumbling sensations during transition from variable idle to nominal idle.

Each curve was fit to a simple cubic polynomial function with coefficients equal to the values shown in Table 7. A sine function can be calculated to complete the sub-threshold transition from variable idle to nominal idle using these cubic parameters.

TABLE 7

Polynomial Parameters for Different Canal Threshold Values

| $\vec{a}_{SCC}$ (°/s²) | $x^3$ | $x^2$ | $x^1$ | $x^0$ |
| --- | --- | --- | --- | --- |
| 2.0 | −0.0285976516961960 | 0.242033364290467 | −0.206492405624392 | 2.35268394930876 |
| 1.5 | −0.0214482387721460 | 0.181525023217843 | −0.154869304218279 | 1.76451296198156 |
| 1.0 | −0.0142988258480980 | 0.121016682145233 | −0.103246202812196 | 1.17634197465438 |
| 0.5 | −0.00714941292404900 | 0.0605083410726166 | −0.0516231014060979 | 0.588170987327191 |
| 0.25 | −0.00357470646202450 | 0.0302541705363083 | −0.0258115507030490 | 0.294085493663595 |

We base the maximum roll angular velocity on the mid G level, $G_{mid}$, during the transition.

$$G_{mid} = \frac{G_{idle-new} + G_{idle}}{2}$$

From this G level we can calculate the maximum roll angular velocity, $\dot{\varphi}_{max}$, using the coefficients in Table 7.

$$\dot{\varphi}_{max} = x^3 G_{mid}^3 + x^2 G_{mid}^2 + x^1 G_{mid}^1 + x^0$$

We define the change in roll angle, $\Delta\varphi$, as the difference between the roll angle at variable idle and the roll angle at nominal idle.

$$\Delta\varphi = \varphi_{idle-new} - \varphi_{idle}$$

Using $\Delta\varphi$ and $\dot{\varphi}_{max}$ we can calculate the time, T, or period, of the roll transition.

$$T = \frac{2\Delta\varphi}{\dot{\varphi}_{max}}$$

And finally an expression for the complete sine transition curve.

$$\varphi(t) = \varphi_{idle-new} - \frac{\Delta\varphi}{T}\left[t - \frac{T}{2\pi}\sin\left(\frac{2\pi t}{T}\right)\right]$$

CONCLUSION

Reference herein to "about" or "approximately" with respect to the term 1G OR 1.4G means a G-force generally experienced by a person resting on the Earth's surface, but may be slightly more or less than 1G, depending on location and/or slight movement of the arm of a centrifuge-based simulator.

Reference herein to "example," "embodiments" or similar formulations means that a particular feature, structure, operation or characteristic described in connection with the example, is included in at least one implementation in this description. Thus, the appearance of such phrases or formulations herein are not necessarily all referring to the same example. Further, various particular features, structures, operations, or characteristics may be combined in any suitable manner in or more examples.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system for operating a centrifuge-based-flight simulator, comprising:
   one or more processors, and computer-readable media communicatively coupled to the one or more processors collectively forming a controller, the controller operable in one of:
   a first state in which the controller instructs the simulator to upload G-forces on a trainee to a first-G-force value during a first duration when the trainee performs a simulated-flight condition in the simulator representing an increased-G-force flight event in an actual aircraft, wherein the first G-force value is substantially greater than a nominal-G force state experienced by a trainee when performing a non-G-force-flight event in the simulator; and
   a second state in which the controller instructs the simulator to:
   (i) transition from the first state to a second state in which G-forces are unloaded on the trainee approaching a nominal-G force value when the trainee performs a simulated flight condition in the simulator representing a transition from an increased-G-force flight event toward a nominal-G-force flight event in an actual aircraft, and
   (ii) determine, impart, and maintain an intermediate-G-force value, in lieu of the nominal-G force value, on the trainee for a second duration before transitioning to the nominal-G-force value, wherein the intermediate-G-Force value is less than the first-G-force value and more than the nominal-G force value, wherein the controller determines the intermediate-G-force value based on at least the following:
   (a) a length of the first duration,
   (b) an intensity of the first-G-force value imparted on the trainee during the first duration; and
   (c) an angle of rotation experienced by the trainee during the first duration, wherein the intermediate-G-force value is greater than actual G-forces occurring in a predetermined aircraft during the same flight conditions as the simulated flight conditions.

2. The system of claim 1, whereby the trainee perceives the intermediate-G-force value as corresponding to the nominal-G force value despite the intermediate-G-force value being greater than the nominal-G force value.

3. The system of claim 1, wherein the controller is further operable in a third state in which the controller instructs the simulator to transition from the second state to a third state after completion of the second duration, wherein G-forces imparted on the trainee during the third state are less than the G-forces imparted on the trainee during the second state.

4. The system of claim 1, wherein the nominal-G force value is between about 1G and 2G.

5. The system of claim 1, wherein the controller is further operable in a third state in which the controller instructs the simulator to transition from the second state to a third state after completion of the second duration, wherein when operating in the third state the simulator is instructed to decelerate its rotation at a rate below a generally perceptible threshold for human detection by the trainee in the simulator.

6. The system of claim 1, wherein during the first and second states, the controller further instructs the simulator to generate a virtual scene in a cockpit of a virtual plane representing an actual-predetermined aircraft replicated by the simulator.

7. A method for minimizing unpleasant Coriolis effects in a centrifuge-based-flight simulator having a gondola located at a distal end of an arm of the simulator, the method comprising:
   rotating the gondola about its center axis for a first duration of time at a first rate of rotation, and angle that physically imparts a heightened G-force on a trainee located in the gondola during operation of the simulator, wherein the heightened G-force is substantially greater than a nominal G-force;
   receiving an instruction to change the first rate of rotation to a rate of rotation that imparts a nominal G-force on the trainee;
   before, and in lieu of, immediately changing to a rate of rotation that physically imparts a nominal G-force on the trainee:
   (a) determining an intermediate G-force to impart on the trainee based on: (i) an intensity of the heightened G-force; (ii) the first duration of time, and (iii) an angle of rotation experienced by the trainee during the first duration, wherein the intermediate G-force is more than the nominal-G force and less than the heightened-G force;
   (b) determining a second duration of time to physically impart the intermediate G-force on the trainee;
   (c) rotating the gondola about its center axis at a second rate of rotation thereby physically imparting the determined intermediate G-force on the trainee;
   (d) maintaining the second rate rotation for the determined second duration of time before transitioning to a slower rate of rotation; and
   rotating, after the second duration, the gondola about its center axis for a third rate of rotation, which physically imparts a nominal G-force on the trainee.

8. The method of claim 7, further comprising decelerating rotation of the gondola about its center axis from the second rate of rotation to the third rate of rotation at a rate of deceleration generally below a perceptible threshold for human detection by the trainee.

9. The method of claim 7, wherein the heightened-G force imparted on the trainee during the first duration includes a plurality of heightened-G forces.

10. The method of claim 7, further comprising adjusting the roll angle of the gondola of the simulator when transitioning between the first, second and third rates of rotation.

11. The method of claim 7, further comprising generating a virtual scene in a cockpit of a virtual plane representing an actual-predetermined aircraft replicated by the simulator, wherein the cockpit is located in the gondola of the simulator.

12. The method of claim 7, further comprising:
generating a virtual scene in a cockpit of a virtual plane representing an actual-predetermined aircraft replicated by the simulator, wherein the cockpit is located in the gondola of the simulator, and
replicating a first-virtual scene in the cockpit of the simulator during the first duration of time, wherein the first-virtual scene represents a first-flight condition, wherein the heightened-G-force experienced by the trainee during the first-flight condition substantially matches an actual G-force level, which would occur in the predetermined aircraft during the same flight condition as the simulated first-flight condition.

13. The method of claim 7, further comprising:
generating a virtual scene in a cockpit of a virtual plane representing an actual-predetermined aircraft replicated by the simulator, wherein the cockpit is located in the gondola of the simulator, and
replicating a second-virtual scene in the cockpit of the simulator during the determined second duration of time and after the second duration of time, wherein the second-virtual scene represents a second-flight condition,
wherein the intermediate-G-force experienced by the trainee during the second-flight condition is substantially more than an actual G-force, which would occur in the predetermined aircraft during the same flight condition as the simulated second flight condition,
wherein the nominal G-force on the trainee after the second duration and during the second-flight condition substantial matches the actual G-force, which would occur in the predetermined aircraft during the same flight condition as the simulated second-flight condition; and
whereby the trainee is generally unable to perceive the difference between the intermediate-G-force and the nominative-G force when the rate of rotation is transitioned from the heightened-G force to the nominative-G force.

* * * * *